US012762753B2

(12) United States Patent
Zhang et al.

(10) Patent No.: US 12,762,753 B2
(45) Date of Patent: Oct. 13, 2026

(54) TEXT-TO-IMAGE SYSTEM AND METHOD

(71) Applicant: Adobe Inc., San Jose, CA (US)

(72) Inventors: Ruiyi Zhang, San Jose, CA (US); Yufan Zhou, Buffalo, NY (US); Tong Yu, Fremont, CA (US); Tong Sun, San Ramon, CA (US); Rajiv Jain, Falls Church, VA (US); Jiuxiang Gu, Baltimore, MD (US); Christopher Alan Tensmeyer, Fulton, MD (US)

(73) Assignee: Adobe Inc., San Jose, CA (US)

( * ) Notice: Subject to any disclaimer, the term of this patent is extended or adjusted under 35 U.S.C. 154(b) by 278 days.

(21) Appl. No.: 18/318,921

(22) Filed: May 17, 2023

(65) Prior Publication Data

US 2024/0386621 A1 Nov. 21, 2024

(51) Int. Cl.

| | |
|---|---|
| ***G06T 11/00*** | (2026.01) |
| ***G06F 40/40*** | (2020.01) |
| ***G06V 10/74*** | (2022.01) |
| ***G06V 10/774*** | (2022.01) |
| ***G06V 10/82*** | (2022.01) |

(52) U.S. Cl.
CPC .............. *G06T 11/00* (2013.01); *G06F 40/40* (2020.01); *G06V 10/761* (2022.01); *G06V 10/774* (2022.01); *G06V 10/82* (2022.01)

(58) Field of Classification Search
CPC ......... G06T 11/00; G06F 40/40; G06V 10/82; G06V 10/761; G06V 10/774
See application file for complete search history.

(56) References Cited

U.S. PATENT DOCUMENTS

| | | | | |
|---|---|---|---|---|
| 2023/0072759 A1* | 3/2023 | Zhang | .................. | G06N 3/0475 |
| 2023/0154153 A1* | 5/2023 | Adato | ...................... | G06T 19/20 382/159 |
| 2024/0177507 A1* | 5/2024 | Im | ............................ | G06F 40/40 |

OTHER PUBLICATIONS

Sawant, Ronit, et al. "Text to image generation using GAN." Proceedings of the international conference on IoT based control networks & intelligent systems—ICICNIS. 2021. (Year: 2021).*

Zhou, Y., et al. "Lafite: Towards language-free training for text-to-image generation. arxiv." arXiv preprint arXiv:2111.13792v3 (Mar. 24, 2022). (Year: 2022).*

Zhu, Jianwei, et al. "Image-text matching with fine-grained relational dependency and bidirectional attention-based generative networks." Proceedings of the 30th ACM international conference on multimedia. 2022. (Year: 2022).*

(Continued)

*Primary Examiner* — Daniel F Hajnik
(74) *Attorney, Agent, or Firm* — FIG. 1 Patents

(57) ABSTRACT

Techniques and systems for training and/or implementing a text-to-image generation model are provided. A pre-trained multimodal model is leveraged for avoiding slower and more labor-intensive methodologies for training a text-to-image generation model. Accordingly, images without associated text (i.e., bare images) are provided to the pre-trained multimodal model so that it can produce generated text-image pairs. The generated text-image pairs are provided to the text-to-image generation model for training and/or implementing the text-to-image generation model.

20 Claims, 6 Drawing Sheets

(56) References Cited

OTHER PUBLICATIONS

Ding, Ming , et al., “CogView: Mastering Text-to-Image Generation via Transformers”, Advances in Neural Information Processing Systems 34 [retrieved Feb. 21, 2023]. Retrieved from the Internet <https://proceedings.neurips.cc/paper/2021/file/a4d92e2cd541fca87e4620aba658316d-Paper.pdf>., May 2021, 14 Pages.

Goodfellow, Ian J, et al., “Generative Adversarial Nets”, In: Advances in neural information processing systems (2014) [retrieved Feb. 21, 2023]. Retrieved from the Internet <https://www.cs.utah.edu/~zhe/teach/archived/2019f/6190-pdf/gans.pdf>., Jun. 10, 2014, 9 pages.

Heusel, Martin , et al., “GANs Trained by a Two Time-Scale Update Rule Converge to a Local Nash Equilibrium”, NIPS’17: Proceedings of the 31st International Conference on Neural Information Processing Systems [retrieved Feb. 21, 2023]. Retrieved from the Internet <https://proceedings.neurips.cc/paper/2017/file/8a1d694707eb0fefe65871369074926d-Paper.pdf>., Jan. 12, 2018, 12 pages.

Hinz, Tobias , et al., “Semantic Object Accuracy for Generative Text-to-Image Synthesis”, Cornell University arXiv, arXiv.org [retrieved Feb. 21, 2023]. Retrieved from the Internet <https://arxiv.org/pdf/1910.13321.pdf>., Jun. 2, 2020, 22 Pages.

Li, Wenbo , et al., “Object-driven Text-to-Image Synthesis via Adversarial Training”, Cornell University arXiv, arXiv.org [retrieved Feb. 21, 2023]. Retrieved from the Internet <https://arxiv.org/pdf/1902.10740.pdf>., Feb. 27, 2019, 23 Pages.

Lin, Tsung-Yi , et al., “Microsoft COCO: Common Objects in Context”, Cornell University arXiv, arXiv.org [retrieved Jun. 14, 2023]. Retrieved from the Internet <https://arxiv.org/pdf/1405.0312.pdf>., Feb. 21, 2015, 15 Pages.

Liu, Yunfan , et al., “Style Intervention: How to Achieve Spatial Disentanglement with Style-based Generators?”, Cornell University arXiv, arXiv.org [retrieved Feb. 21, 2023]. Retrieved from the Internet <https://arxiv.org/pdf/2011.09699.pdf>., Nov. 19, 2020, 10 Pages.

Paszke, Adam , et al., “PyTorch: An Imperative Style, High-Performance Deep Learning Library”, Cornell University arXiv, arXiv.org [retrieved Mar. 16, 2023]. Retrieved from the Internet <https://arxiv.org/pdf/1912.01703.pdf>., Dec. 3, 2019, 12 Pages.

Radford, Alec , et al., “Learning Transferable Visual Models From Natural Language Supervision”, Cornell University arXiv, arXiv.org [retrieved Jun. 29, 2023]. Retrieved from the Internet <https://arxiv.org/pdf/2103.00020.pdf>., Feb. 26, 2021, 48 Pages.

Ramesh, Aditya , et al., “Zero-Shot Text-to-Image Generation”, Cornell University arXiv, arXiv.org [retrieved Feb. 21, 2023]. Retrieved from the Internet <https://arxiv.org/pdf/2102.12092.pdf>., Feb. 26, 2021, 20 Pages.

Razavi, Ali , et al., “Generating Diverse High-Fidelity Images with VQ-VAE-2”, Advances in Neural Information Processing Systems 32 [retrieved Feb. 21, 2023]. Retrieved from the Internet <https://proceedings.neurips.cc/paper/2019/file/5f8e2fa1718d1bbcadf1cd9c7a54fb8c-Paper.pdf>., Jun. 2, 2019, 11 Pages.

Salimans, Tim , et al., “Improved Techniques for Training GANs”, NIPS’16: Proceedings of the 30th International Conference on Neural Information Processing Systems [retrieved Feb. 21, 2023]. Retrieved from the Internet <https://proceedings.neurips.cc/paper/2016/file/8a3363abe792db2d8761d6403605aeb7-Paper.pdf>., Dec. 5, 2016, 10 pages.

Sharma, Piyush , et al., “Conceptual Captions: A Cleaned, Hypernymed, Image Alt-text Dataset for Automatic Image Captioning”, Proceedings of the 56th Annual Meeting of the Association for Computational Linguistics [retrieved Feb. 21, 2023]. Retrieved from the Internet <https://aclanthology.org/P18-1238.pdf>., Jul. 2018, 10 Pages.

Van Den Oord, Aaron , “Neural Discrete Representation Learning”, Advances in Neural Information Processing Systems 30 [retrieved Feb. 21, 2023]. Retrieved from the Internet <https://proceedings.neurips.cc/paper/2017/file/7a98af17e63a0ac09ce2e96d03992fbc-Paper.pdf>., Nov. 2017, 10 Pages.

Vaswani, Ashish , et al., “Attention is All You Need”, Cornell University arXiv Preprint, arXiv.org [retrieved Aug. 9, 2023]. Retrieved from the Internet <https://arxiv.org/pdf/1706.03762.pdf>., Dec. 6, 2017, 15 pages.

Wu, Zongze , et al., “StyleSpace Analysis: Disentangled Controls for StyleGAN Image Generation”, Cornell University arXiv, arXiv.org [retrieved Feb. 21, 2023]. Retrieved from the Internet <https://arxiv.org/pdf/2011.12799.pdf>., Dec. 3, 2020, 25 Pages.

Xu, Tao , et al., “AttnGAN: Fine-Grained Text to Image Generation with Attentional Generative Adversarial Networks”, Cornell University arXiv, arXiv.org [retrieved Feb. 21, 2023]. Retrieved from the Internet <https://arxiv.org/pdf/1711.10485.pdf>., Nov. 28, 2017, 9 pages.

Zhang, Han , et al., “Cross-Modal Contrastive Learning for Text-to-Image Generation”, Cornell University arXiv, arXiv.org [retrieved Feb. 21, 2023]. Retrieved from the Internet <https://arxiv.org/pdf/2101.04702.pdf>., Apr. 14, 2022, 19 Pages.

Zhu, Minfeng , et al., “DM-GAN: Dynamic Memory Generative Adversarial Networks for Text-to-Image Synthesis”, Cornell University arXiv, arXiv.org [retrieved Feb. 21, 2023]. Retrieved from the Internet <https://arxiv.org/pdf/1904.01310.pdf>., Apr. 2, 2019, 9 Pages.

* cited by examiner

Algorithm 1 Training text-to-image generation model without text

Input: An image dataset $\{\mathbf{x}_i\}_{i=1}^{n}$, hyper-parameters $\xi > 0, h > 0$
// Pre-process the image dataset
for $i = 1$ to $n$ do
    Initialize $\tilde{\mathbf{f}}_i \leftarrow 0$;
    for $j = 1$ to k do
        Randomly crop image $\mathbf{x}_i$ to be $h \times h$;
        $\tilde{\mathbf{f}}_i \leftarrow \tilde{\mathbf{f}}_i + f_{\text{img}}(\mathbf{x}_i)$;
    end for
    $\bar{\mathbf{f}}_i \leftarrow \tilde{\mathbf{f}}_i / k$;
    $\mathbf{f}'_i \leftarrow \bar{\mathbf{f}}_i / \|\bar{\mathbf{f}}_i\|_2$, where $\|\cdot\|_2$ denotes L2 norm;
end for
// Train the text-to-image generation model
while Not Converge do
    Sample mini-batch $\{\mathbf{x}_i\}_{i=1}^{m}$;
    Sample noise vector $\{\sigma_i\}_{i=1}^{m} \sim \mathcal{N}(0, \mathcal{I})$;
    $\sigma_i \leftarrow \sigma_i / \|\sigma_i\|_2$;
    $\mathbf{f}'_i \leftarrow \mathbf{f}'_i + \xi \sigma_i$;
    Train the model with loss evaluated by pairs $\{(\mathbf{x}_i, \mathbf{f}'_i)\}_{i=1}^{m}$;
end while

FIG. 6

TEXT-TO-IMAGE SYSTEM AND METHOD

BACKGROUND

Text-to-image generation models have achieved great success in various real-world applications. However, creation of such models is quite challenging. In general, text-to-image generation models have been trained and implemented using large datasets containing high-quality text-image pairs. One of the major challenges in training and implementing such text-to-image generation models (e.g., image generative adversarial networks (image GANs)) is creating and providing the large number of high-quality text-image pairs. While image samples are often easily accessible, provision of the associated text descriptions often requires careful human captioning and filtering. This process of providing text-image pairs is labor intensive, time consuming and costly. One example of the creation of a large set of text-image pairs is a model referred to as conceptual captions. This dataset includes 3.3 million text-image pairs that are filtered from 5 billion images from around 1billion English webpages. Another example is the Microsoft Common Objects in Context (MS-COCO) dataset, which took over 70,000 worker hours to gather and annotate.

In some circumstances, it is possible to use pre-existing datasets of text-image pairs for training a text-to-image model, but such pre-existing datasets are sparse, and the text-image pairs are almost never properly or perfectly tailored for training any particular text-to-image model. As one example, it may be desirable to create a text-to-image model with a custom purpose (e.g., a model that produces flower arrangements based upon textual input). Finding a pre-existing dataset suitable for training such a model may be extremely difficult. Even if that pre-existing dataset exists, that dataset will almost certainly not be as desirable as a custom created dataset of text-image pairs. Further, as suggested, the time and cost of creating a custom dataset of text-image pairs can be time and/or cost prohibitive.

As such, it would be highly desirable to be able to train and implement text-to-image models, particularly custom text-to-image models, while limiting or avoiding the cost, time and labor associated with manually creating huge libraries of text-image pairs.

SUMMARY

A method and system for training and/or implementing a text-to-image generation model is provided. A plurality of images is provided in accordance with the system and method. The images of the plurality of images do not include text descriptions. In other words, the images are provided as bare images without having any corresponding text, which is descriptive of those images. The plurality of images is inputted to a pre-trained multimodal model, and the pre-trained model then creates a plurality of generated text-image pairs based upon the images. This plurality of generated text-image pairs is provided to a text-to-image generation model typically along with the original plurality of images for training and/or implementing the model.

The generated text-image pairs can, for example, be created by providing the plurality of images to an image encoder of the pre-trained multimodal model. The model can then assign text to each of the images thereby creating the generated text-image pairs.

The text-to-image generation model typically includes a generator and a discriminator. In such model, the generator creates generated images based upon the generated text-image pairs or at least based upon the text of the generated text-image pairs. Unless otherwise specified, the phrase “based upon the generated text-image pairs” as used to describe the manner of generating generated images means that generation can be based upon the text, the images or both of the generated text-image pairs.

Once created, the generated images are then provided to the discriminator along with the original plurality of images. The discriminator compares the generated images with the plurality of images and provides feedback to the generator, which then produces more generated images based upon the feedback. In this manner, the generator is trained to generate realistic images. In the model, the discriminator can also function to determine, based upon the generated text-images pairs, whether it is likely that text associated with a generated image actually describes that image.

It is contemplated that the system and method described herein can have several features. The pre-trained multimodal model can include an image encoder and a text encoder and can be trained with a large set of text-image pairs, the large set including at least 10,000,000, 100,000,000 or more text-image pairs. The plurality of images can include at least 1,000,000, 10,000,000 or more images and the plurality of generated text-image pairs includes at least 1,000,000, 10,000,000 or more generated text-image pairs. The text-to-image generation model can be a GAN model having a generator and discriminator, the generator producing generated images based upon the generated text-image pairs, the plurality of images or both, the generated images being provided to the discriminator to train the discriminator to produce realistic images with features of the plurality of images. The training and/or implementing of the text-to-image generation model can be accomplished entirely or substantially entirely with generated text-image pairs generated by the pre-trained multimodal model.

Further features can additionally or alternatively be included. The number of manually created text-image pairs used to train and/or implement the text-to-image generation model can be limited to few or no such pairs. The providing steps and the inputting step of the method can be repeated (e.g., at least once) to further train and/or implement the text-to-image generation model. During training, the text being paired with the generated images can be tested for cosine similarity until a threshold value for the cosine similarity is achieved, the threshold value being at least 0.27.

This summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 6 depicts an example of an algorithm useful for the method and system of training and/or implementing the text-to-image generation model.

DETAILED DESCRIPTION

Overview

Text-to-image generation models, as used herein, are machine learning models, which typically take natural language descriptions and produce images based upon those descriptions. In some cases, images produced by text-to-image models have begun to approach the quality of real photographs and human drawn art. Several text-to-image models have been created such as DALL-E-2, IMAGEN and others. These models typically combine a language model, which transforms the input text into a latent representation, and a generative image model, which produces an image conditioned on that representation.

The effectiveness of these models often depends upon both the quantity and quality of the images and corresponding text that is provided to train and/or implement the text-to-image generation model. Some of the most effective models have drawn together massive amounts of text and image data from a variety of sources including the web and data compilations to train the text-to-image generation models.

Unfortunately, the process of assembling this massive amount of data is a daunting one. Finding, creating and/or editing text-image pairs to be suitable for training a text-to-image generation model involves significant labor and cost. In certain instances, accurate and usable text must be assigned to images in an accurate and consistent manner. In other instances, images must be amended (cropped, enhanced or the like) to be suitable or desirable for training a text-to-image model. While some advances have been made in production of text-image pairs, the amount of time, labor, and cost for producing the pairs is still very significant.

Accordingly, techniques for training and implementing a text-to-image model are described that overcome conventional challenges. Rather than producing text-image pairs in a manner that is time, cost and/or labor intensive, the system and/or method for training and/or implementing a text-to-image generation model leverages a pre-trained multimodal (e.g., image and text) model to generate generated text-image pairs. In this way, training and/or implementation can be accomplished with only a few or without any manually create text-image pairs. Images can be inputted to the text-to-image generation model as bare images without text that is descriptive of the content that is in the images.

As used herein, a bare image is an image devoid of any phrase descriptive of that image in a way that describes the subject matter a human perceives when viewing the image. For example, a bare image that would be perceived by a human as a zebra running through a jungle would be devoid of any text phrases such as “zebra running through a jungle”. Additionally, a bare image is also devoid of text describing that image in a way that text of conventional text-image pairs would describe the image for the purpose of providing text-image pairs to a machine learning model that generates images based upon inputted text.

Example Environment

Figure 1:
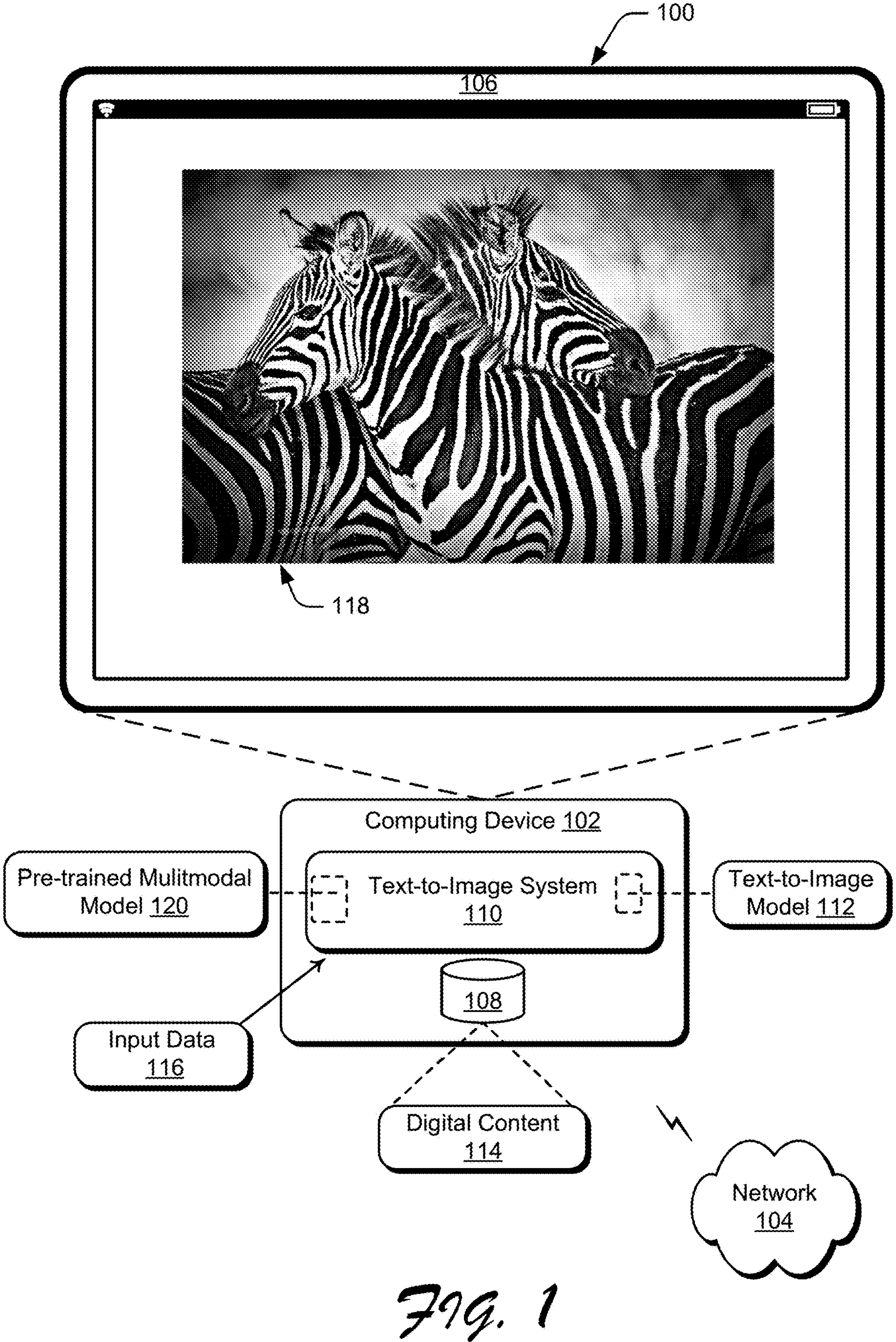
FIG. 1 is an illustration of a digital medium environment in an example implementation of an example system that can be employed to train and/or implement a text-to-image generation model.

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations “over the cloud.”

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 (e.g., a computer-readable storage media) that can store instructions that are executable or responsive to execution by a processing device allowing the processing device to perform various operations. The computing device 102 also includes a text-to-image system 110 for training and/or implementing a text-to-image generation model 112. The storage device 108 is illustrated to include digital content 114 such as digital images, electronic documents, digital templates, font files of fonts, digital artwork, etc. The system 110 can include or at least have access to a pre-trained multimodal model 120 for training and/or implementing the text-to-image generation model 112.

The system 110 is illustrated as having, receiving, and/or transmitting input data 116. For instance, the input data 116 can be digital images used to train and/or implement the text-to-image generation model 112 such that the system 110, and, in particular, the text-to-image generation model 112 can be trained and/or implemented to produce images 118 based upon text inputted to the model 112. In other words, once trained and/or implemented, a user may input text into the system 110, particularly into the text-to-image generation model 112 and the system 110 or model 112 will produce images 118 that are described by the inputted text.

Consider an example in which a user interacts with an input device (e.g., a mouse, a stylus, a keyboard, a touch-screen, etc.) to transmit the input data 116 to the system 110 via the network 104. In this example, the system 110 receives and processes the input data 116 to train and/or implement the text-generation model 112. To do so in one example, the system 110 processes the input data 116 to train and/or implement the text-to-image generation model 112 using a machine learning model.

As used herein, the term “machine learning model” refers to a computer representation that is tunable (e.g., trainable) based on inputs to approximate unknown functions. By way of example, the term “machine learning model” includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model can include, but is not limited to, clustering, decision trees, support vector machines, linear regression, logistic regression, Bayesian networks, random forest learning, dimensionality reduction algorithms, boosting algorithms, artificial neural networks (e.g., fully connected neural networks, deep convolutional neural networks, or recurrent neural networks), deep learning, etc. By way of example, a machine learning model makes high-level abstractions in data by generating data-driven predictions or decisions from the known input data.

In general, the system 110 leverages the pre-trained multimodal model 120 to train and/or implement the text-to-generation model 112. The images 116 provided as input data are inputted to the pre-trained multimodal model 120 to produce generated text-image pairs. The generated text-image pairs are then provided to the text-to-image generation model 112 to train and/or implement the model 112. In this way, the text-to-image generation model 112 can be trained and implemented using few or even no manually created text-image pairs. Once trained and/or implemented, the system 110, via the text-to-image generation model 112, can receive text from a user and produce images described by that text.

The pre-trained multimodal model can be a neural network model. The pre-trained multimodal model can also be an image-text model that has been extensively trained with a substantial quantity of text-image pairs. The model can be trained with a quantity of at least 100,000, more typically at least 10,000,000 and still more typically at least 100,000,000 or even 400,000,000 text-image pairs.

The pre-trained multimodal model can have few-or zero-shot capabilities. As used herein, few-or zero-shot capabilities means that the model can classify an image from a class even where the model has not been trained on any or only a few images of that particular class. Such a model will typically have information, particularly class information, that allows the model to recognize an image from a new class based on information about the differences between the new class and similar classes upon which the model has already been trained. For example, a model could be trained to identify images of horses but might also be able to identify zebras with the understanding that zebras appear like horses with stripes. Few-shot, as used herein to refer to the number of training images used to train the pre-trained multimodal model in a chosen category, is typically less than 100, more typically less than 10 and even more typically less than 3. Zero-shot is, as it suggests, zero images in the chosen category. For example, a pre-trained multimodal model that has few-shot capabilities would be able to recognize a second category of images based upon training with a first category of images and information correlating a second category of images to the first category and training on less than 100, more typically less than 10 and even more typically less than 3 images from the second category. A pre-trained multi-modal model having zero-shot capabilities could recognize images of the second category with only training on the first category of images and information correlating the second category to the first category and training on zero images from the second category.

The pre-trained multimodal model can, for example, have two encoders, one that embeds items of a first mode (e.g., text) into a space and another that embeds items of a second mode (e.g., images) into that space. The items of the first mode and the items of the second mode can be encoded into the space as vectors for which a cosine similarity can be determined telling how well or closely the items of the first mode associate with items of the second mode.

The pre-trained multimodal model can, for example, include a text encoder and an image encoder. The model has then been trained using the substantial quantity of text-image pairs with the text encoder embedding the texts of those pairs as text vectors and the image encoder encoding the images of those pairs as image vectors. The model then determines cosine similarities for text vectors relative to the image vectors such that the images matched with their proper text have high cosine similarities while the images matched with improper text have low cosine similarities. Upon training with the substantial quantity of text-image pairs, the model is able to associate text with images that the text describes with a high degree of accuracy while avoiding associating text with images that the text does not accurately describe. In this way, the pre-trained multimodal model is contrastively trained to be able to associate text with images in a way that the text describes the images.

Figure 2:
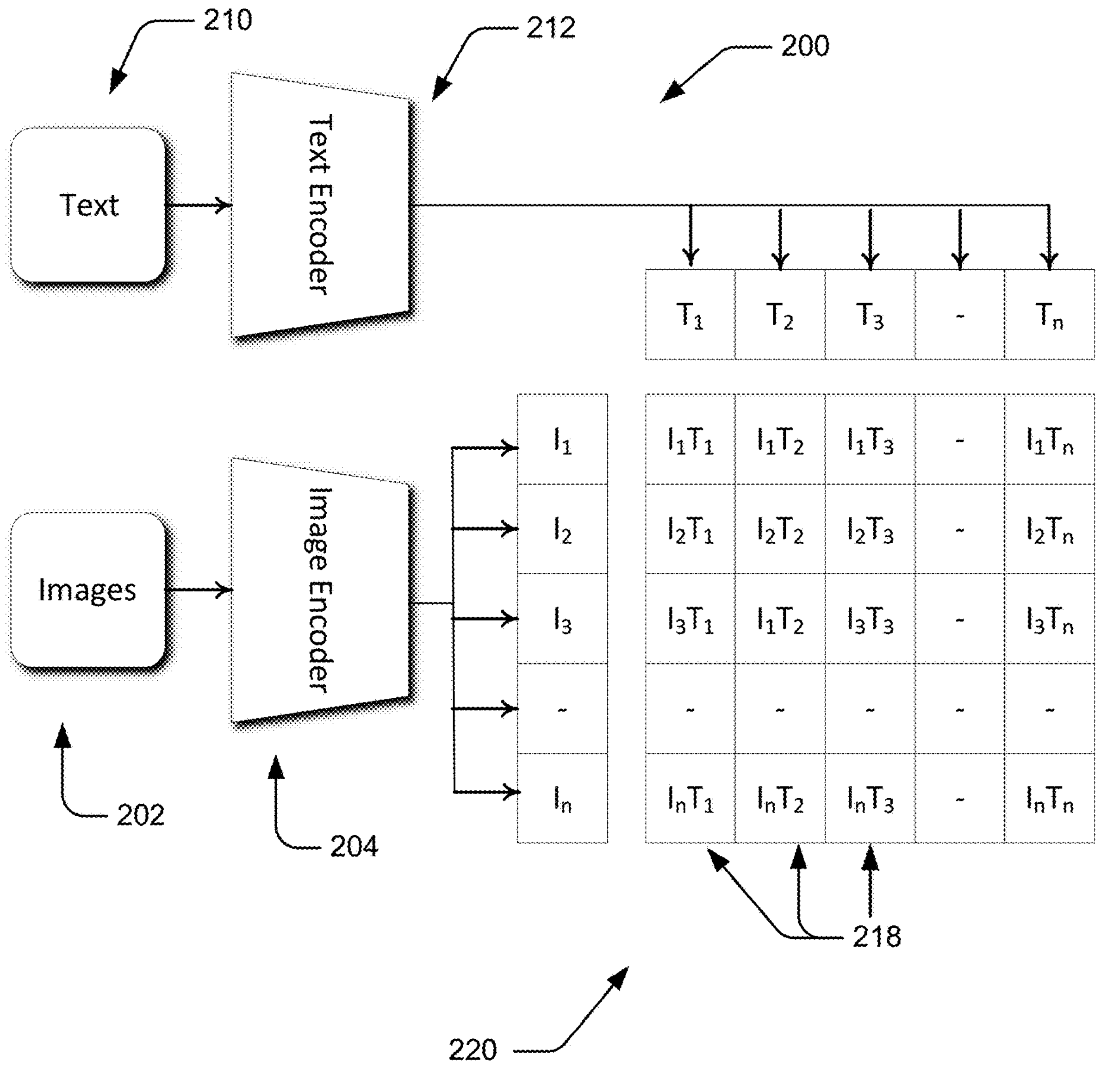
FIG. 2 depicts an example of a pre-trained multimodal model system that can be used as part of training and/or implementing a text-to-image model.

An example of a pre-trained multimodal model 200 is illustrated in FIGS. 2 and 6. As can be seen, images 202 are input to the image encoder 204 (e.g., an image transformer) and associated text 210 is input to the text encoder 212 (e.g., a text transformer). In turn, the text 210 and images 202 are placed as text-image pairs 218 in a multimodal space 220 (e.g., a semantic space) based upon their similarities (e.g., cosine similarities). The similarities are maximized in the cases of matched text and image such as $I_1T_1$, $I_2T_2$, $I_3T_3$ . . . $I_nT_n$ while the similarities are minimized in all other cases of unmatched text and image such as $I_2T_1$, $I_2T_3$, $I_2T_3$ etc. In this way, the pre-trained multimodal model 200 is trained to associate proper text with proper images.

One highly desirable pre-trained multimodal model that associates text with images is the contrastive language-image pre-training (CLIP) model. The CLIP model is available from OpenAI. It is a neural network model that has been trained on 400,000,000 text-image pairs. The CLIP model includes an image encoder and a text encoder that maps the text and image of text-image pairs to the same space (e.g., a joint feature and/or multimodal space). The CLIP model measures the semantic similarity of any text-image pair as evaluated by their cosine similarity.

Generally, the text-to image generation model, once trained, has the capability to intake written description[s] (i.e., descriptive text) and create image[s] based upon the description[s]. The text-to-image model will typically include two or more neural networks that work together to compose an image based upon the provided text. The image is typically analyzed according to instructions within the text-to-image model until the model determines that the image properly represents the inputted text.

The text-to-image generation model can be nearly any model that can be trained with text-image pairs. In a preferred example, the text-to image generation model includes a generator and a discriminator. The generator analyzes text inputted to the text-to image generation model and creates an image based upon the inputted text. The discriminator then compares the generated images with real images to determine if the generated images are sufficiently similar to real images. If the generated image is not sufficiently similar, the generated image is rejected, and the generator must refine the generated image and send it back to the discriminator. This cycle continues until the discriminator determines that the generated image is sufficiently similar to the real images. Once this latter determination has been made, the generated image can be released by the text-to-image model.

One preferred type of text-to-image generation model is a generative adversarial network or GAN model. Examples of preferred text-to-image GAN models include, without limitation, deep convolutional GANs (DCGANs), self-attention GANs (SAGANs), variational autoencoder GANs (VAE-GANs) and GANs of the styleGAN series (e.g., style-GAN2).

Advantageously, the system and methodology can train and/or implement the text-to-image generation model entirely or substantially entirely with generated text-image pairs generated by the pre-trained multimodal model. In other words, few or no manually created text-image pairs are needed or used to train and/or implement the text-to-image generation model. As used herein, the term substantially entirely, as it refers to training and/or implementation of the text-to-image generation model with generated text-image pairs generated by the pre-trained multimodal model, means the training or implementation is carried out with at least 90%, more typically at least 95% and even more typically at least 99% generated text-image pairs generated by the pre-trained multimodal model. These percentages are meant to denote the number of generated text-image pairs relative to the overall number of text-image pairs used to train and/or implement the model. For example, ten (10) text-image pairs where nine (9) of those pairs are generated text-image pairs generated by the pre-trained multi-modal model means 90% of the text-image pairs are generated text-image pairs generated by the pre-trained multimodal model. As used herein, the phrase few or no as it refers to manually created text-image pairs means either zero manually created text-image pairs or less than 10,000, more typically less than 1000 and even more typically less than 100manually created text-image pairs.

Figure 5:
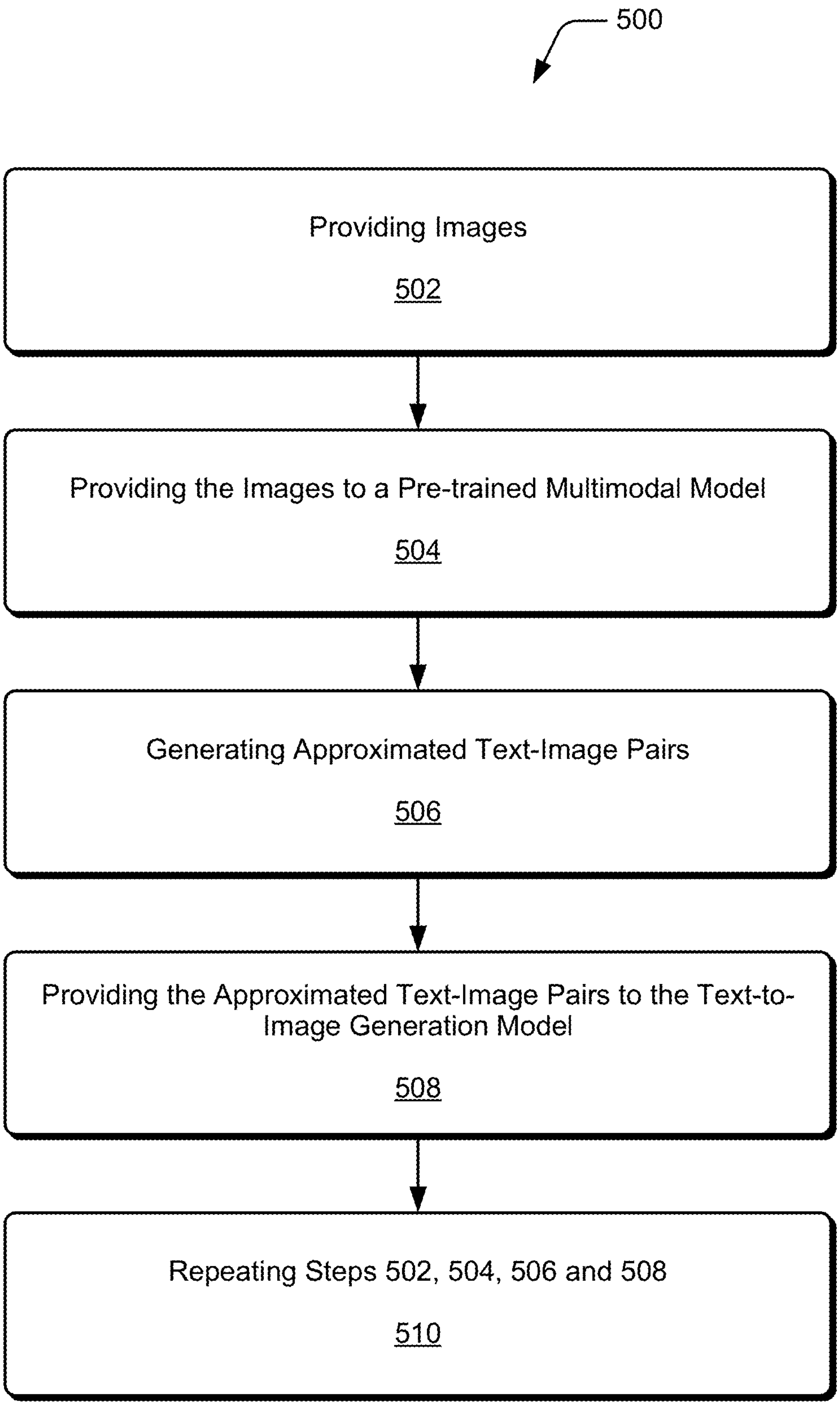
FIG. 5 depicts an example of a method of training and/or implementing a text-to-image generation model.

Referring to FIG. 5, an example of a method 500 of training and/or implementing a text-to-image generation model is illustrated. At 502 a plurality of images is provided for training and/or implementing the text-to-image generation model. That plurality of images is provided at 504 to the pre-trained multimodal model for generating, at 506, generated text-image pairs. Once generated, the generated text-image pairs are provided at 508 to the text-to-image generation model. Advantageously, as shown at 510, the steps of the methodology can be repeated to further train and/or implement the text-to-image generation model and/or the overall system.

The text-to-image model is trained and/or implemented using a plurality of images that are inputted to the multi-modal pre-trained model. The plurality of images may be a customized set of images or a more randomized set of images. However, depending upon the desired output of the text-to-image model, the images will often be customized according to one or more themes. As an example, the plurality of images may all be animals forming a customized set of images that are animal themed. Examples of other potential theme include, without limitation, faces, cars, lakes and so on.

Depending upon the pre-trained multimodal model, it can be desirable to edit (e.g., crop, zoom or otherwise edit) the images of the plurality of images to be in a format more acceptable for the pre-trained multimodal model. Such editing will depend upon the pre-trained multimodal model employed in the system or method. For example, the CLIP model is designed to input images that are square and have a 224×224 resolution. Such editing can be accomplished manually or automatically, The quantity of images provided to the pre-trained multimodal model can depend upon the theme chosen or the lack of theme. Typically, the plurality of images will include at least 10,000 images, more typically at least 100,000 images and even more typically at least 1,000,000 images or more. All the images may be according to a theme for a customized set of images or may not be customized.

Upon inputting the plurality of images, the pre-trained multimodal model generates a plurality of generated text-image pairs. In particular, the model analyzes the plurality of images and then assigns text to each of the plurality of images. In this manner, the pre-trained multimodal model creates the generated text-image pairs.

In the example discussed above, the pre-trained multi-modal model includes the image encoder and the text encoder. The image encoder embeds each image of the plurality of images into a space (e.g., a joint feature and/or semantic space) of the pre-trained multimodal model. The images are embedded as vectors. The images may be embedded as a whole or as image features. The text encoder assigns text as vectors to each image of the plurality of images and can measure the semantic similarity of the text-image pairs. If the text matches well with the image, the pair will have a high cosine similarity. The cosine similarity for the generated text-image pairs is typically at least 0.2, more typically at least 0.27 and even more typically at least 0.3 or even 0.34. It will be understood that the images can be embedded as whole images or image features and the text can be assigned to the whole images or image features for creating generated text-image pairs.

Figure 4:
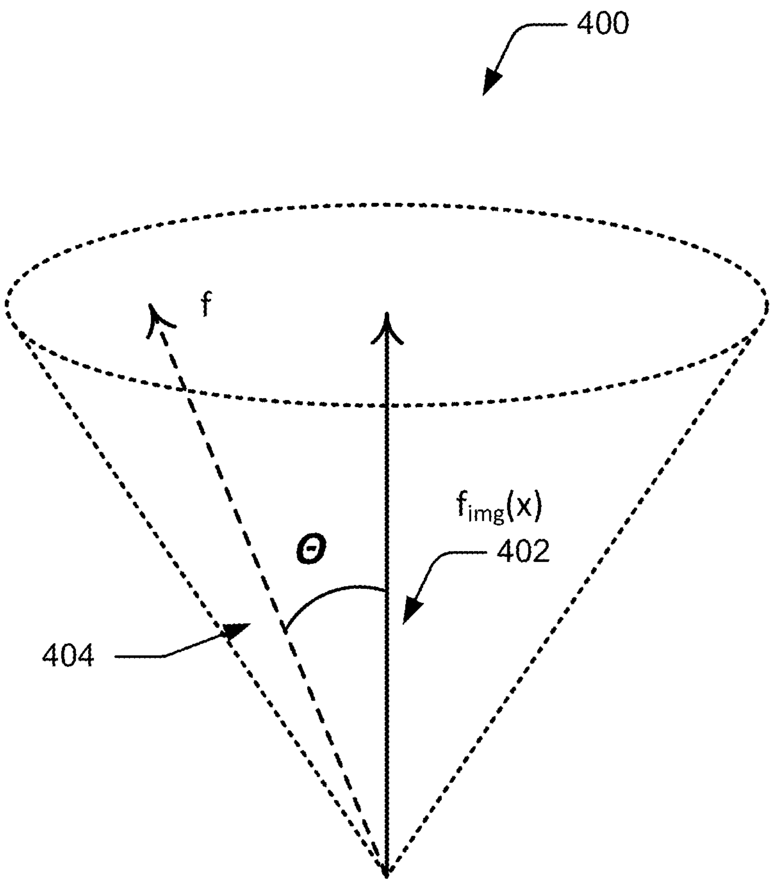
FIG. 4 depicts an illustration of a schematic representation of a determination of whether a particular text is likely to closely describe an image accurately.

FIG. 4 illustrates a schematic representation 400 of the determination of whether a particular text is likely to closely describe an image accurately. In particular, FIG. 4 shows a first vector 402, which represents a text feature generated by the text encoder and a second vector 404, which represents an image. If the text matches well with the image, the pair will have a high cosine similarity. It is generally desirable the generated text-image pairs have a high cosine similarity.

In this manner, a plurality of generated text-image pairs is created on the same order as the number of images that are provided to the pre-trained multimodal model. Thus, the plurality of generated text-image pairs will include at least 10,000 pairs, more typically at least 100,000 pairs and even more typically at least 1,000,000 pairs or more. The text of these generated text-image pairs should accurately describe the images with which they are associated due to the high cosine similarity.

In order to train and/or implement the text-to-image generation model, the plurality of generated text-image pairs and the original plurality of images are fed to the text-to-image generation model. For example, the generated text-image pairs can be located in and accessed from a space of the text-to-generation model (e.g., an intermediate space of the text-to-image generation model) or directly from a space of the pre-trained multimodal model (e.g., the joint feature or semantic space of the pre-trained multimodal model). As another example, the generated text-image pairs can be located in the joint space of the pre-trained multimodal model by implementation of an algorithm in or associated with that space and can be accessed from that space. Additionally or alternatively, the text of the generated text-image pairs can be injected into an intermediate space of the text-to-image generation model.

The generator encodes the text of the generated text-image pairs, particularly the text of the generated text-image pairs, so that it can generate training or fake images associated with text that likely describes those images. For example, the text feature can be generated by perturbing the image features with noise (e.g., normalized gaussian noise). The discriminator functions to distinguish training images from the original plurality of images. The discriminator also functions to determine whether it is likely that text associated with an image describes that image. Based on the feedback from the discriminator, the generator is trained to produce training images that are closer and closer to real images (i.e., the original plurality of images) and produce text associated with those images where the text has a greater and greater probability of being descriptive of the images. In this manner, the discriminator and generator compete in an adversarial way to produce more realistic images with text descriptions that have a high probability of accurately describing those images.

Like the determination of cosine similarity determined by the pre-trained multimodal model, the cosine similarity of text-image pairs produced by the text-to-image generation model, particularly the discriminator of the text-to-image generation model can be determined. This can occur during training or implementation of the text-to-image generation model. During training, text-image pairs created by the text-to-image generation model can, for example, be placed in a semantic space (e.g., the semantic or joint feature space of the pre-trained multimodal model or the intermediate space of the text-to-image generation model) and their cosine similarities determined. The cosine similarities of the text-image pairs created by the text-to-image model typically get higher during training until a threshold value is achieved for the cosine values. Alternatively or additionally, a threshold value for image generation of the text-to-image model could be set (i.e., only images with higher cosine similarity with input text could be presented by the model). These threshold values for cosine similarity are typically at least 0.2, more typically at least 0.27 and even more typically at least 0.3 or even 0.34.

The text-to-image generation model can be at least partially trained prior to its communication and training with the pre-trained multimodal model. As such, it is contemplated that the text-to-image generation model is further trained by the pre-trained multimodal model. The text-to-image generation model can also be further trained and/or implement by repeating the training and/or implementation after initial training with the pre-trained multimodal model. For example, it may become desirable to expand the capability of a text-to-image generation model that was trained and/or implemented according the method or system described herein. In such an example, additional images may be identified and the steps of the methodology can be repeated such that the text-to-image generation model is further trained and/or implemented. A potential repetition of the steps is shown at 510 of FIG. 5.

Figure 3:
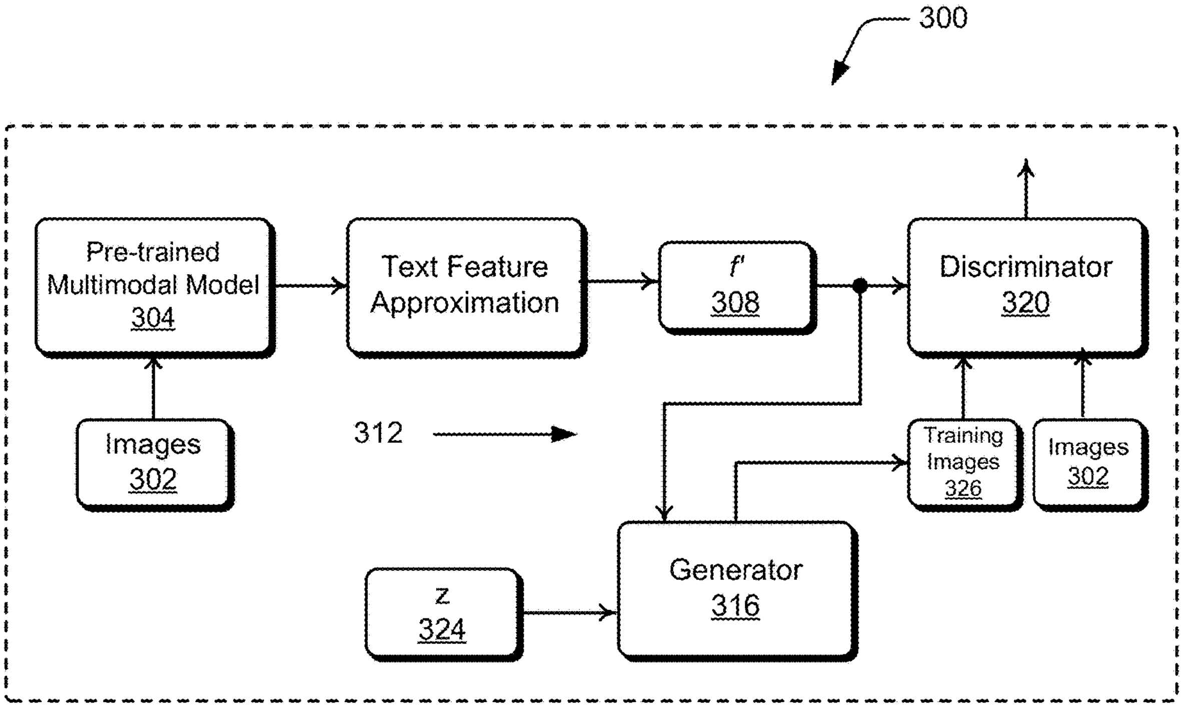
FIG. 3 depicts an example of a system comprised of a pre-trained multimodal model and a text-to-image generation model.

Referring to FIG. 3, an example of a system 300 for training and/or implementing a text-to-image generation model is illustrated. As can be seen, images 302 are provided to a pre-trained multimodal model 304 (e.g., the CLIP model). The model 304 then, through text feature approximation, outputs the generated text-image pairs 308. The generated text-image pairs 308 are then provided to the text-to-image generation model 312. In particular, the generated text-image pairs 308, or at least the text thereof, are provided to a generator 316 of the text-to-image generation model 312 and/or a discriminator 320 of the text-to-image generation model 312. The generator 316 encodes the generated text-image pairs 308, particularly the text of the pairs, and, using a noise vector 324, generates training images 326. The training images 326, along with the original images 324 are provided to a discriminator 320 of the text-image generation model 312.

The discriminator 320 functions to distinguish training images 326 from the original images 302. The discriminator 320 also functions to determine whether it is likely that text associated with an image describes that image. Based on the feedback from the discriminator 320, the generator 316 is trained to produce training images 326 that are closer and closer to the original images 302 and produce text associated with those images where the text has a greater and greater probability of being descriptive of the images. In this manner, the discriminator 320 and generator 316 compete in adversarial way to produce more realistic images with text descriptions that have a high probability of accurately describing those images.

It will be understood that the system described herein can include both the pre-trained multimodal model and the text-to-image generation model or only the text-to-image model that has been trained with the pre-trained multimodal model. Advantageously, the pre-trained multimodal model can, itself, be trained with additional text-image pairs and can be used to update the text-to-image generation model. Alternatively, or additionally, the text-to-image generation model can, after further training of the pre-trained multimodal model or at any other time, be further trained and/or implemented according to the steps of the methodology described herein.

It shall also be understood that the text-to-image generation model can be trained with the generated text-image pairs and can be further trained with standard text-image pairs. Typically, the text-to-image generation model will be trained with at least 1000, more typically at least 1,000,000 and even more typically at least 10,000,000 or even 100,000,000 generated text-image pairs.

The system described herein can, for example, include both the pre-trained multimodal model in communication with the text-to-image generation model and one or both models allow for further training. As such, the pre-trained multimodal model can be updated with additional text-image pairs and then can automatically, or upon command, can further train the text-to-image model. Further, the text-to-image model can be enhanced by further training the model with additional standard text-image pairs. It will also be understood that the pre-trained multimodal model and the text-to-image generation model can be selectively placed in communication with each other to accomplish the aforementioned.

EXAMPLES

In an example, the CLIP model is used to train and/or implement the text-to-image generation model. The image encoder is designated as $f_{img}$ and the text encoder is designated as $f_{txt}$ to denote image encoder of the pre-trained multimodal model. A text-image pair is denoted by (x; t) and x' is the corresponding generated image. The real text feature extracted from ground-truth and generate fake text is denoted as f, f' respectively. A sample from the standard random Gaussian distribution is denoted as z~N(0, I) and serves as one input to the text-image generation model. In this example, image only (i.e., text free) training and/or implementation are achieved using the CLIP model to generate latent text features for images inputted to the CLIP model thereby creating generated text-image pairs, which are fed to the text-to-image generation model to generate corresponding images under a GAN framework.

With reference to FIG. 4, for a high-quality associated text-image pair (t; x), their encoded features $f=f_{txt}(t)$ and $f_{img}(X)$ should have high cosine similarity in the joint feature space of the CLIP model. Since text descriptions and images do not follow one-to-one correspondence in practice, given an image x, the corresponding text t should not be a fixed value. In other words, a set of text features, denoted as $\{f_i'\}_{i=1}$, can be generated as long as they satisfy $\cos(f_i', f_{img}(x)) \geq c$ for all i with a predefined threshold $c>0$.

In this example, the method of training and/or implementing the text-to-image generation model is put into practice using Algorithm 1 from FIG. 6. The plurality of images is pre-processed to obtain image features by data augmentation and feature extraction (lines 5 to 8 of algorithm 1). These features are then normalized (lines 9 to 10 of algorithm 1). Text features are than generated by perturbing the image features with normalized Gaussian noise (lines 15 to 17 of algorithm 1). The feature normalization steps in Algorithm 1 much like perturbing un-normalized image features with adaptive noise $\sigma_i\|\tilde{f}\|/\|\sigma_i\|$. Notably, feature norms of text description can vary and adaptive noise is applied.

With the normalization and adaptive noise in Algorithm 1, it can be proven that $\cos(f_i', f_{img}(x)) \geq c$ is satisfied with high probability. Letting d be the dimension of the joint feature space, the lower bound of the probability can scale exponentially with respect to d. The $\cos(f_i', f_{img}(x)) \geq c$ can be satisfied in high-dimensional cases.

The text-to-image generation model in this example is a conditional GAN model. In particular, the unconditional Style GAN2 model is adapted to form a conditional generative model.

Conditional information is injected into the StyleSpace of the StyleGAN2 model as follows: (i) Random noise vectors $z \in Z$ are transformed into an intermediate latent space $\mathcal{W}$ via a mapping network that includes a sequence of fully connected (FC) layers. Advantageously, the latent space $\mathcal{W}$ is believed to better reflect the disentangled nature of the learned distribution. Each $w \in \mathcal{W}$ is further transformed to channel-wise unconditional style codes s, using a different learned affine transformation for each layer of the generator. The space spanned by these style parameters is often referred to as StyleSpace or S. For a conditional vector h from the image-text joint semantic space of CLIP, it is transformed into condition codes c, using a different learned 2-layer FC network for each generator layer. At each layer of the generator, the style and conditional codes are concatenated to obtain [s; c], which is further transformed to channel-wise conditional style codes u, using a different learned affine transformation for each generator layer. The space then spanned by these style parameters is a conditional stylespace U.

For generating images based on text, the discriminator ensures that a generated image satisfies two criteria: accuracy of the image to human perception and accuracy of the text condition relative to the image. To this end, an input image x is encoded with a shared discriminator backbone. Then two tasks are performed (each with a task-specific FC layer): i) $f_d(x)$ projects x into a scalar space, indicating real or generated for an input image x; and ii) $f_s(x)$ embeds x into the pre-trained CLIP semantic space. The cosine similarity $Sim(h; f_s(x))$; $h=f_{txt}(t)$ is computed to indicate how well the input image x is semantically aligned/conditioned with its paired text t. The discriminator output is:

$$d(x, h) = \underbrace{f_d(x)}_{\text{true or fake}} + \underbrace{Sim(h, f_s(x))}_{\text{semantic alignment}},$$

With true being original images and fake being generated images.

Intuitively, d (x; h) yields a high value for an image x, when it is original (with large $f_d(x)$ values) and the semantic similarity between h and $f_s(x)$ is high.

The text-to-image model in this example can also include several losses for different goals. The first one is the standard GAN loss. The losses for the generator and discriminator are defined, with the logits from equation 1, as:

$$\mathcal{L}_G = -\mathbb{E}_{p(x',t)}[\log \sigma(d(x', h))],$$

$$\mathcal{L}_D = -\mathbb{E}_{p(x,t)}[\log \sigma(d(x, h))] - \mathbb{E}_{p(x',t)}[\log(1 - \sigma(d(x', h)))]$$

where σ(·) denote the Sigmoid function.

Second, to enforce $f_s(x)$ being semantically aware, the model employs the following contrastive regularizer:

$$\mathcal{L}_{Ctr} = -\sum_{i=1}^{n} \log \frac{\exp(\tau Sim(f_s(x_i), h_i))}{\sum_{j=1}^{n} \exp(\tau Sim(f_s(x_j), h_i))}$$

where Sim denotes the cosine similarity, σ, τ are non-negative hyper-parameters, $$\{(x_i, t_i)\}_{i=1}^{n}$$

is a mini-batch of text-image paired samples. Intuitively, the regularizer enforces the discriminator to output feature $f_s(x_i)$ that is similar to the corresponding input text feature h, while being distinguished from other text features $\{h_j\}_{j\neq i}$.

The pre-trained CLIP model is also used to enhance the semantic correspondence. Intuitively, a generated image $$x_i'$$

should have high semantic similarity with the corresponding text $h_i$, while having low semantic similarities with other text features $\{h_j\}_{j\neq i}$. Similar to the contrastive regularizer equation, we define the following contrastive loss:

$$\mathcal{L}_{CLIP} = -\sum_{i=1}^{n} \log \frac{\exp(\tau Sim(f_{img}(x_i'), h_i))}{\sum_{j=1}^{n} \exp\left(\tau Sim\left(f_{img}(x_j'), h_i\right)\right)}$$

where β, τ are non-negative hyper-parameters.

With the above contrastive regularizers, the final training loss for the generator and discriminator are defined as:

$$\mathcal{L}_G' = \mathcal{L}_G + \lambda \mathcal{L}_{CLIP} + \gamma \mathcal{L}_{Ctr}, \quad \mathcal{L}_D' = \mathcal{L}_D + \gamma \mathcal{L}_{Ctr}.$$

Experiments

Performance of the system and method can be evaluated under different settings. For example, performance can be evaluated by text-to-image generation with text-image training data, by using the proposed language-free training setting, and using the zero-shot learning setting. Ablation studies were also conducted to investigate more details of the proposed method. Experiments were conducted on 4 Nvidia Tesla V100 GPUs, implemented using Pytorch.

Text-to-image Generation: For text-to-image generation tasks, each training image sample is associated with one or more accurate text descriptions. The commonly used MS-COCO dataset was employed for training. The 2014 train/validation split 82K training images and 40K validation images were used and each image was associated with five short captions. The results are reported in Table 1, with detailed hyper-parameter settings provided in the Appendix. Text is randomly sampled from the validation set and generates 30,000 images to compute the Fréchet Inception Distance (FID) and Inception Score (IS). Accordingly, the Semantic Object Accuracy (SOA) is reported, where three images are generated for each caption for calculation. The image only training model consistently outperforms other methods in all evaluation metrics, setting new state of the art in standard text-to image generation on MS-COCO.

TABLE 1

Text-to-image generation results on MS-COCO dataset.

| Model | IS ↑ | FID ↓ | SOA-C ↑ | SOA-I ↑ |
|---|---|---|---|---|
| AttnGAN [17] | 23.61 | 33.10 | 25.88 | 39.01 |
| Obj-GAN [5] | 24.09 | 36.52 | 27.14 | 41.24 |
| DM-GAN [19] | 32.32 | 27.34 | 33.44 | 48.03 |
| OP-GAN [17] | 27.88 | 24.70 | 35.85 | 50.47 |
| XMC GAN [18] | 30.45 | 9.33 | 50.94 | 71.33 |
| Ours | 32.34 | 8.12 | 61.09 | 74.78 |

Table 2 below illustrates successful creation of the text-to-image generation model trained with only images. In the table, VinVL-Captioning denotes a baseline that uses an automatic captioning model trained on image-text pairs, to generate image-text pairs for text-to-image generation model. As can be seen, the image only training system is more effective.

TABLE 2

Results of language-free setting on MS-COCO dataset, FID-k means the FID is computed after blurring all the images by a Gaussian Filter with radius k.

| Model | IS↑ | FID-0↓ | FID-1↓ | FID-2↓ | FID-4↓ | FID-8↓ |
|---|---|---|---|---|---|---|
| VinVL-Captioning | 15.83 | 56.36 | 54.99 | 51.84 | 44.81 | 37.28 |
| Ours | 27.20 | 18.04 | 17.80 | 17.68 | 16.16 | 14.52 |

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

generating a plurality of generated text-image pairs by inputting a plurality of bare images to a pre-trained multimodal model having a text encoder and an image encoder implementing a multimodal embedding space in which cosine similarity of the plurality of bare images in the multimodal embedding space to a plurality of text, respectively, is used to generate the text-image pairs;

training a text-to-image generation model using the plurality of generated text-image pairs, the text-to-image generation model trained as a generative adversarial network (GAN) having a generator and discriminator to train the generator to produce an image based upon text; and testing, during the training, the text being paired with the generated images for cosine similarity until a threshold value for the cosine similarity is achieved, the threshold value being at least 0.27.

2. The method of claim 1, wherein the pre-trained multimodal model includes the image encoder and the text encoder and has been trained with a set of text-image pairs, the set of text-image pairs including at least 10,000,000 text-image pairs.

3. The method of claim 1, wherein the plurality of bare images includes at least 1,000,000 images and the plurality of generated text-image pairs includes at least 1,000,000 generated text-image pairs.

4. The method of claim 1, wherein the training of the text-to-image generation model is accomplished using the generated text-image pairs generated by the pre-trained multimodal model.

5. The method of claim 1, wherein the text-image pairs are not manually created.

6. The method of claim 5, wherein the training of the text-to-image generation model is performed independent of manually created text-image pairs.

7. The method of claim 1, wherein the training of the text-to-image generation model includes receiving a plurality of images customized based, at least in part, on a desired output of the text-to-image generation model.

8. The method claim 1, wherein the pre-trained multimodal model has few-shot or zero-shot capability with few-shot meaning less than 100.

9. A system comprising:

a plurality of bare images;

a pre-trained multimodal model that inputs the plurality of bare images and generates a plurality of generated text-image pairs, the pre-trained multimodal model having a text encoder and an image encoder implementing a multimodal embedding space in which cosine similarity of the plurality of bare images in the multimodal embedding space to a plurality of text, respectively, is used to generate the text-image pairs; and a text-to-image generation model trained as a generative adversarial network (GAN) having a generator and discriminator to train the generator to produce an image based upon text, the text-to-image generation model being trained using the plurality of bare images and the plurality of generated text-image pairs based, at least in part, on testing, during the training, the text being paired with the generated images for cosine similarity until a threshold value for the cosine similarity is achieved, the threshold value being at least 0.27.

10. The system of claim 9, wherein the pre-trained multimodal model includes the image encoder and the text encoder and has been trained with a set of text-image pairs, the set of text-image pairs including at least 10,000,000 text-image pairs and wherein the plurality bare of images includes at least 1,000,000 images and the plurality of generated text-image pairs includes at least 1,000,000 generated text-image pairs.

11. The system of claim 9, wherein the training is accomplished with generated text-image pairs generated by the pre-trained multimodal model.

12. The system of claim 9, wherein the text-image pairs are not manually created.

13. The system of claim 9, wherein the text-to-image generation model is trained by receiving a plurality of images customized based, at least in part, on a desired output of the text-to-image generation model.

14. The system as in of claim 9, wherein the pre-trained multimodal model has few-shot or zero-shot capability with few-shot meaning less than 100.

15. A non-transitory computer-readable storage media storing instructions that, responsive to execution by a processing device, cause the processing device to perform operations comprising:

inputting a plurality of bare images to a pre-trained multimodal model, the pre-trained model generating a plurality of generated text-image pairs, the pre-trained multimodal model having a text encoder and an image encoder implementing a multimodal embedding space in which cosine similarity of the plurality of bare images in the multimodal embedding space to a plurality of text, respectively, is used to generate the text-image pairs; and training a text-to-image generation model using the plurality of generated text-image pairs, the text-to-image generation model trained as a generative adversarial network (GAN) having a generator and discriminator to train the generator based, at least in part, on testing, during the training, the text being paired with the generated images for cosine similarity until a threshold value for the cosine similarity is achieved, the threshold value being at least 0.27.

16. The non-transitory computer-readable storage media of claim 15 wherein the pre-trained multimodal model includes the image encoder and the text encoder and has been trained with a set of text-image pairs, the set including at least 10,000,000 text-image pairs.

17. The non-transitory computer-readable storage media of claim 15, wherein the plurality of bare images includes at least 1,000,000 images and the plurality of generated text-image pairs includes at least 1,000,000 generated text-image pairs.

18. The non-transitory computer-readable storage media of claim 15, wherein the training of the text-to-image generation model is accomplished with generated text-image pairs generated by the pre-trained multimodal model.

19. The non-transitory computer-readable storage media of claim 15, wherein the training the text-to-image generation model is performed independent of manually created text-image pairs.

20. The non-transitory computer-readable storage media of claim 15, wherein the pre-trained multimodal model has few-shot or zero-shot capability with few-shot meaning less than 100.

* * * * *